United States Patent Office 2,784,704
Patented Mar. 12, 1957

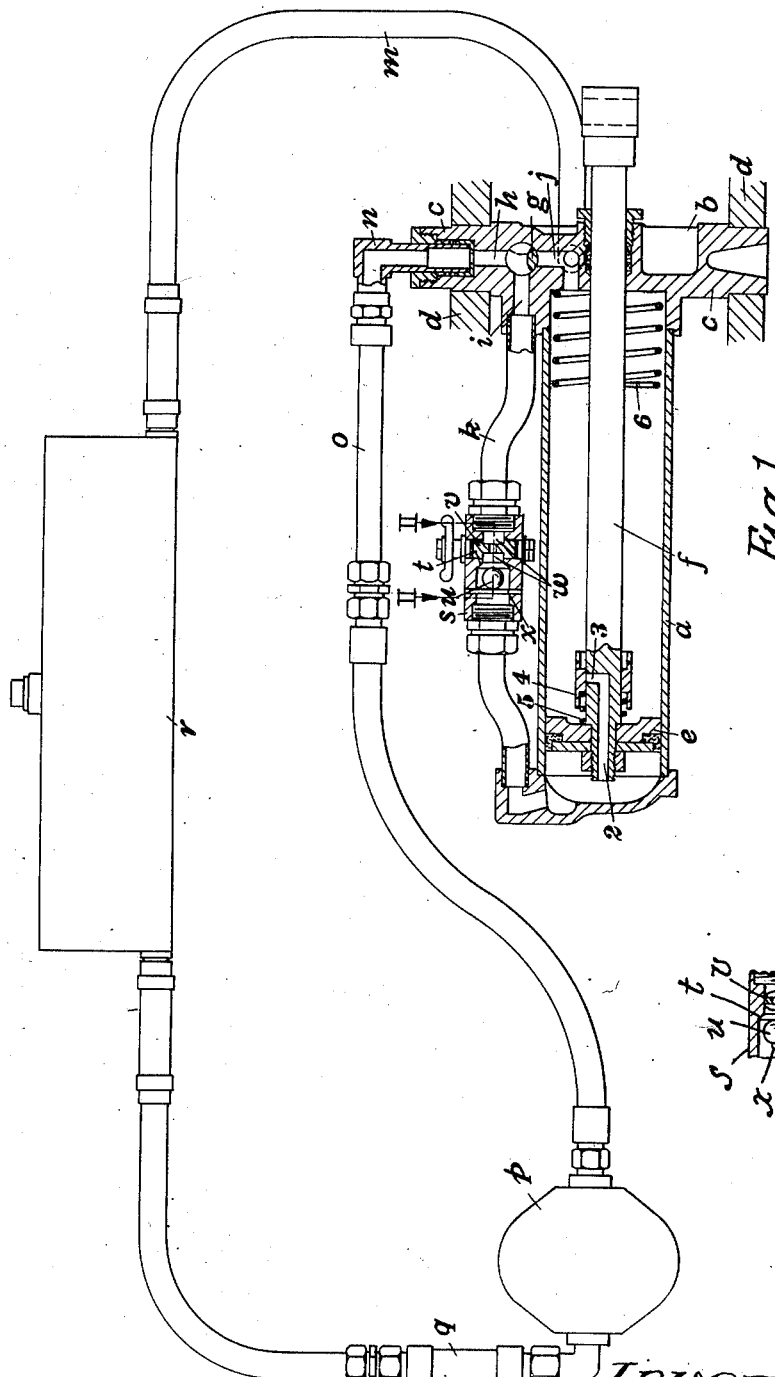

2,784,704

CONTROL VALVES FOR HYDRAULICALLY OPERATED VEHICLE OR OTHER LOADERS

William Henry Meats, Cheltenham, England, assignor to Telehoist Limited, near Cheltenham, England Application August 15, 1952, Serial No. 304,589

Claims priority, application Great Britain October 24, 1951

3 Claims. (Cl. 121—46)

This invention relates to loaders of the pivoted-arm type for lifting bags of wheat or like material, bales of straw or paper, bins or barrels, or any of a variety of other materials or articles from ground or floor level on to a raised platform, or on to a vehicle, or for other like purposes.

The object of the invention is to provide improved means for actuating the loader arm, the means being of the kind comprising a hydraulic ram, a pump, and an associated system in which the motive liquid can be continuously circulated by the pump.

The invention comprises a means of the kind above specified, having in combination therewith a three-way valve for controlling the flow of motive liquid to and from the ram, a non-return valve for preventing reverse movement of the ram, and means whereby the non-return valve can be rendered inoperative.

The accompanying drawings illustrate a loader-arm actuating means embodying the invention.

Figure 1 is a diagrammatic view partially in section.

Figure 2 is a section on the line II—II of Figure 1.

Referring to the drawing, the ram cylinder $a$ is secured at one end to a cover $b$ on which are formed trunnions $c$ by which the cylinder is pivotally supported in fixed bearings $d$. Within the cylinder is contained a piston $e$, and from the piston extends a rod $f$ which at its outer end is adapted for attachment to the loader arm.

In the said cylinder end cover $b$ is formed a bore containing a rotatable three-way valve plug $g$ adapted to control the associated passages $h$, $i$, $j$, the portion of the plug adjacent to these passages being shaped as shown. This plug may be rotatable by hand, and is shown in one position in dotted lines, and in another position in full lines.

The passage $i$ is connected by a pipe $k$ to the left-hand end of the ram cylinder $a$, and in this pipe is contained a non-return valve to be hereinafter described. The passage $j$ leads to the right-hand end of the cylinder and also to a return pipe $m$. The passage $h$ is connected by a swivelled pipe fitting $n$ to a flow pipe $o$ connected to the delivery side of the pump $p$. The inlet side of the pump is connected by a pipe $q$ to a replenishing tank $r$ to which is also connected the return pipe $m$.

The non-return valve in the pipe $k$ comprises a body part $s$ in which is formed a seating $t$ for a closure member $u$, the latter being in the form of a ball. Adjacent to the said seating there is formed in the body part $s$ a bore in which is located a rotatable plug $v$, this being operable by hand. The plug has formed on one or each side a recess $w$. Also it is adapted to allow liquid to flow through or past it. The recesses are such that when either lies adjacent to the closure member $u$, the latter can sit on its seating. But when the plug is rotated through 90°, the peripheral surface of the plug encounters the closure member and holds it off its seating. The range of freedom of the closure member is limited at the side remote from the seating by a retaining pin $x$.

Reverting now to the ram cylinder and piston, the inner end of the piston rod has formed in it an axial passage 2 leading to a port 3, and on the adjacent part of the piston rod is mounted a sleeve 4 loaded by a spring 5 for controlling the port 3, the purpose of this arrangement being described later.

The mode of action of the means above described is as follows:

Assuming that the attendant has moved the valve plug $g$ to the position shown in full lines (the pump being in action), motive liquid passes to the left-hand end of the cylinder $a$ by way of the pipes $o$, $k$. The piston $e$ is thereupon moved to the right for raising the loader arm. When the piston reaches the end of its travel the sleeve 4 is caused by contact with the cylinder end cover to move against the action of its spring and open the port 3, thus allowing continued flow of the motive liquid along the passage 2 and pipe $m$ to the tank and thence back to the pump, thus preventing a possibly dangerous rise of liquid pressure in the ram cylinder. At the same time the plug $g$ is moved to its dotted line position.

With the plug $v$ of the non-return valve in the position shown, the closure member $u$ will now be moved on to its seating by the pressure set up in the ram cylinder by the force exerted on the outer end of the piston rod by the loader arm thus preventing return of the piston and the loader arm. Consequently, when it is required to hold the loader arm in its upper position the plug $v$ is set in the position shown. To enable the loader arm to return the plug $v$ is rotated through 90° so causing the closure member $u$ to be moved off its seating. To facilitate initiation of the return movement of the piston a spring 6 may be provided in the cylinder as shown.

When it is required that the loader arm shall return on reaching its upper position, the plug $v$ of the non-return valve is left in the position in which it holds the closure member $u$ out of action. Consequently when the plug $g$ is moved to the dotted line position, the piston and loader arm are allowed to return.

To render the ram inoperative, the plug $g$ is turned to the position in which it closes the passage $i$. The motive liquid then circulates idly along the pipes $o$, $m$, $q$, and through the tank $r$ and pump $p$.

By this invention the control of the loader arm to suit different working conditions can be effected in a very simple and convenient manner.

Having thus described my invention what I claim as new and desire to secure by Letters Patent is:

1. A hydraulic mechanism comprising in combination a ram cylinder, a piston slidable in said cylinder, a piston rod extending from said piston through one end of said cylinder, a three way valve mounted on said cylinder and having a pressure liquid supply port, a pressure fluid exhaust port in communication with one end of said cylinder, a pressure fluid transfer port in communication with a passage leading to the other end of said cylinder, and a three-position movable member which in one position closes said exhaust port only, in another position leaves all of the three ports open, and in a third position closes said transfer port only, a non-return valve in said passage, and means operable independently of said movable member for holding said non-return valve open when required.

2. A hydraulic mechanism comprising in combination a ram cylinder, a piston slidable in said cylinder, a piston rod extending through said piston and from the latter through one end of said cylinder, the portion of said piston rod which extends through said piston having therein an axial passage and a port communicating with said axial passage at one side of said piston, a spring-loaded sleeve mounted on said piston rod for controlling the port therein, said sleeve being movable to open said port by contact with one end of said cylinder when said piston reaches the corresponding end of its travel, a spring in said cylinder for facilitating return movement of said piston, a three-way valve mounted on said cylinder and having a pressure liquid supply port, a pressure fluid exhaust port in communication with one end of said cylinder, a pressure fluid transfer port in communication with a passage leading to the other end of said cylinder, and a three-position movable member which in one position closes said exhaust port, in another position leaves all of the three ports open, and in a third position closes said transfer port, a non-return valve in the passage communicating with said transfer port, and means operable independently of said movable member for holding said non-return valve open when required.

3. A hydraulic mechanism comprising in combination a ram cylinder, a piston slidable in said cylinder, a piston rod extending from said piston through one end of said cylinder, a three-way valve mounted on said cylinder and having a pressure liquid supply port, a pressure fluid exhaust port in communication with one end of said cylinder, a pressure fluid transfer port in communication with a passage leading to the other end of said cylinder, and a three-position movable member which in one position closes said exhaust port, in another position leaves all of the three ports open, and in a third position closes said transfer port, a non-return valve arranged in said passage and comprising a freely-movable closure member and a seating for co-operating with said closure member, and means operable independently of said three-position movable member for holding said non-return valve open when required, said means comprising a rotary apertured plug arranged in said passage and shaped so that it serves in one position to hold said closure member off its seating, and in another position to allow said non-return valve to function normally.

References Cited in the file of this patent

UNITED STATES PATENTS

| | | |
|---|---|---|
| 1,904,345 | Anthony | Apr. 18, 1933 |
| 1,940,508 | Proctor | Dec. 19, 1933 |
| 1,987,083 | Smith | Jan. 8, 1935 |
| 2,071,605 | Anthony et al. | Feb. 23, 1937 |
| 2,094,466 | Proctor | Sept. 28, 1937 |
| 2,164,911 | Garverick | July 4, 1939 |
| 2,438,317 | Gabriel | Mar. 23, 1948 |
| 2,509,589 | Deardorff et al. | May 30, 1950 |
| 2,695,764 | Grebe | Nov. 30, 1954 |

FOREIGN PATENTS

| | | |
|---|---|---|
| 489,663 | Great Britain | Aug. 2, 1938 |
| 615,834 | Great Britain | Jan. 12, 1949 |